United States Patent
Kauppinen et al.

(10) Patent No.: US 11,537,123 B2
(45) Date of Patent: Dec. 27, 2022

(54) SYSTEM USED FOR IMPROVING AUTOMATIC CONTROL OF MACHINE OPERATIONS OF CONSTRUCTION SITE MACHINERY

(71) Applicant: LEICA GEOSYSTEMS AG, Heerbrugg (CH)

(72) Inventors: Tommi Juhani Kauppinen, Manly West (AU); Damien Dusha, Tarraginidi (AU)

(73) Assignee: LEICA GEOSYSTEMS AG, Heerbrugg (CH)

( * ) Notice: Subject to any disclaimer, the term of this patent is extended or adjusted under 35 U.S.C. 154(b) by 312 days.

(21) Appl. No.: 16/819,081

(22) Filed: Mar. 14, 2020

(65) Prior Publication Data

US 2020/0293037 A1  Sep. 17, 2020

(30) Foreign Application Priority Data

Mar. 14, 2019 (EP) ..................................... 19163005

(51) Int. Cl.
  *G05D 1/00* (2006.01)
  *H04W 4/44* (2018.01)
  (Continued)

(52) U.S. Cl.
  CPC ............. *G05D 1/0033* (2013.01); *G01C 3/32* (2013.01); *G05D 1/0022* (2013.01);
  (Continued)

(58) Field of Classification Search
  CPC ............... G05D 1/0033; G05D 1/0022; G05D 2201/0202; H04W 4/44; H04W 4/029; G01C 3/32
  See application file for complete search history.

(56) References Cited

U.S. PATENT DOCUMENTS

| | | | |
|---|---|---|---|
| 5,771,978 A | * | 6/1998 | Davidson ................ E02F 3/847 701/50 |
| 10,060,739 B2 | * | 8/2018 | Metzler .............. H04N 5/23238 |

(Continued)

FOREIGN PATENT DOCUMENTS

| | | |
|---|---|---|
| CN | 105547297 A | 5/2016 |
| CN | 105547305 A | 5/2016 |

(Continued)

OTHER PUBLICATIONS

European Search Report dated Sep. 27, 2019 as received in Application No. 19163005.2.

*Primary Examiner* — Truc M Do
(74) *Attorney, Agent, or Firm* — Maschoff Brennan

(57) ABSTRACT

A system is configured for confirming a mobile cooperative target being automatically tracked and measured by a total station or theodolite in order to automatically control a machine operation of a construction site machine. The system includes at least one total station or theodolite with a UWBST anchor-module having an anchor-ID, and a cooperative target associated with a UWBST tag-module having a tag-identifier (tag-ID) and being used for automatically controlling a machine operation of the construction site machine. The system can include a machine control unit associated with the construction site machine configured for controlling machine operations based on tracking and continuously measuring cooperative targets carried out by the total station or theodolite, and an ultra-wide band (UWB) distance meter associated with the UWBST anchor-module configured for measuring a distance (UWB-distance) between the UWBST anchor-module and the UWBST tag-module.

8 Claims, 3 Drawing Sheets

(51) Int. Cl.
*H04W 4/029* (2018.01)
*G01C 3/32* (2006.01)
(52) U.S. Cl.
CPC ............ *H04W 4/029* (2018.02); *H04W 4/44* (2018.02); *G05D 2201/0202* (2013.01)

(56) References Cited

U.S. PATENT DOCUMENTS

| | | | |
|---|---|---|---|
| 10,240,924 B2* | 3/2019 | Metzler | G01C 15/002 |
| 2010/0066603 A1* | 3/2010 | O'Keefe | G01S 19/10 |
| | | | 342/357.29 |
| 2011/0285592 A1* | 11/2011 | Green | G01C 3/32 |
| | | | 342/451 |
| 2014/0247439 A1 | 9/2014 | Neier et al. | |
| 2015/0106053 A1* | 4/2015 | Ocal | G01C 15/00 |
| | | | 702/150 |
| 2015/0261217 A1 | 9/2015 | Gil | |
| 2017/0353824 A1* | 12/2017 | Hallett | G01S 5/0263 |

FOREIGN PATENT DOCUMENTS

| | | |
|---|---|---|
| CN | 206627112 U | 11/2017 |
| EP | 2570769 A1 | 3/2013 |

\* cited by examiner

PRIOR ART

SYSTEM USED FOR IMPROVING AUTOMATIC CONTROL OF MACHINE OPERATIONS OF CONSTRUCTION SITE MACHINERY

CROSS-REFERENCE TO RELATED APPLICATIONS

This application claims priority to European Patent Application No. 19163005.2 filed on Mar. 14, 2019, which is incorporated herein by reference.

FIELD OF THE INVENTION

The present invention relates to a system being used for improving the automatic control of machine operations of construction site machinery.

BACKGROUND TO THE INVENTION

Since antiquity, a multiplicity of geodetic methods and geodetic devices have been known for the purpose of measuring a cooperative target. A generally known example for such measuring devices and/or geodetic devices is provided by the tachymeter, a total station or theodolite. Such devices have angle and distance measurement functions that permit determination of direction and distance to and from a selected cooperative target. The angle and distance variables are determined in this case in the internal reference system of the device, and still have to be linked, if appropriate, to an external reference system e.g. coordinate system for an absolute determination of position.

Modern total stations or theodolites have microprocessors for further digital processing and storage of acquired measured data. As a rule, the devices are produced in a compact and integrated design, coaxial distance and angle measuring elements, as well as arithmetic logic, control and memory units are mostly integrated in one device. Means for motorizing the targeting optics and accordingly their fields of view for alignment, for reflector-less distance measurement, for automatic target seeking and tracking, and for remote control of the entire device are integrated, depending on the upgrade level of the total station. Total stations known from the prior art further have a radio data interface for establishing a radio link with external periphery components such as, for example, with a data acquisition device that can, in particular, be designed as a handheld data logger, field computer, notebook, minicomputer or PDA. In a more specific case the periphery component can e.g. be a machine control unit which is associated with a machine in particular a construction site machine and serves the purpose of controlling machine operations of the associated machine. By means of the data interface, it is possible for measured data acquired and stored by the total station to be output for external further processing e.g. by the machine control unit, for externally acquired measured data to be read into the total station for the purpose of storing and/or further processing, for remote control signals to be input and/or output for the remote control of the total station e.g. for aligning the total station or theodolite with its field of view to a cooperative target or of a further external component, particularly in mobile use in the field, and for control software to be transcribed into the total station.

The measuring accuracy attainable in the measuring operation varies depending on the design of the cooperative target to be measured. If, however, the cooperative target is represented by a target reflector specifically designed for measurement—such as e.g. a retro-reflecting target—it is therefore possible to achieve substantially more accurate measurement results than given in a reflector-less measurement, for example in relation to a point to be measured on a house wall.

Cooperative targets are commonly used together with total stations or theodolites in systems which are configured to automatically control machine operations of construction site machines e.g. paver machines, excavators etc. Therefore, the cooperative targets are usually installed on the according machine each in relation to a specific reference point of the machine. The positions of each of the cooperative targets are thereby referenced to the machine and the cooperative targets can be tracked and continuously measured by a total station or theodolite within an according coordinate system. Based on the as-measured positions of the cooperative targets a machine control unit can monitor the operation of the machine and derive control information for automatically controlling machine operations of the machine. Depending on the installed positions of the cooperative targets on the machine and the location of the total station or theodolite problems can arise during the automatic tracking and measuring of the cooperative targets. One problem can e.g. be related to reliably assign the cooperative target being tracked and continuously measured to its specific reference point of the machine in order to automatically and reliably control the machine operations. Another problem can e.g. be related to situations where the line of sight contact between the total station or theodolite and a cooperative target is lost due to an obstruction and the "re-found" cooperative target, which is then being tracked and continuously measured, has to be assigned to its specific reference point of the machine.

SUMMARY

In some embodiments, the present invention therefore provides a system for improving the total station or theodolite based automatic control of machine operations of construction site machines by making the automatic tracking and measuring of the cooperative targets more reliable.

In some embodiments, the invention relates to a system which is configured for confirming a mobile cooperative target being automatically tracked and measured in order to automatically control a machine operation of a construction site machine, comprising at least one total station or theodolite having a tracking unit configured for tracking and continuously measuring a cooperative target within a tracking field of view, wherein measuring relates to the determination of a distance to the cooperative target and of a horizontal and vertical angle to the cooperative target within a coordinate system, an optical distance meter for measuring an optical distance to a cooperative target, an ultra-wide band signal transceiver (UWBST) anchor-module (being referenced to the coordinate system) and having an anchor-identifier (anchor-ID), and a cooperative target associated with a UWBST tag-module having a tag-identifier (tag-ID) and being used for automatically controlling a machine operation of the construction site machine, a machine control unit associated with the construction site machine configured for controlling machine operations based on tracking and continuously measuring cooperative targets wherein tracking and continuously measuring is carried out by the total station or theodolite, an ultra-wide band (UWB) distance meter associated with the UWBST anchor-module configured for measuring a distance (UWB-distance) between the UWBST anchor-module and the UWBST tag-module and providing the measured UWB-distance with the assigned tag- and anchor-IDs to the machine control unit, wherein, the machine control unit is configured for matching measured optical distances to measured UWB-distances and using the matching as confirmation that the cooperative target being tracked and continuously measured by the total station or theodolite is the cooperative target being used for automatically controlling the machine operation.

In some embodiments, the UWB-distance can be measured based on a time of flight measurement of UWB signals being transmitted between the UWBST anchor- and tag-modules.

In some embodiments, matching measured optical distances to measured UWB-distances can comprise assigning the tag-ID assigned to the measured UWB-distance to the cooperative target if the measured optical distance to the cooperative target does not differ by more than a tolerance value from the measured UWB-distance.

In some embodiments, the system can comprise a further UWBST anchor-module being referenced to the coordinate system and having an anchor-identifier (anchor-ID), a further UWB-distance meter associated with the further UWBST anchor-module configured for measuring a UWB-distance between the further UWBST anchor-module and the UWBST tag-module and providing the measured UWB-distance with the assigned tag- and anchor-IDs to the machine control unit, wherein the machine control unit is further configured for determining and assigning a horizontal angle (UWB-angle) to the measured UWB-distance, under which UWB-angle the UWBST tag-module is located in view of the total station or theodolite and in relation to the further UWBST anchor-module, and matching the horizontal angle under which the optical distance is measured and which is determined by the tracking unit to the UWB-angle.

In some embodiments, matching measured optical distances to measured UWB-distances comprises assigning the tag-ID assigned to the measured UWB-distance to the cooperative target if the measured optical distance to the cooperative target does not differ by more than a tolerance value from the UWB-distance, and if the horizontal angle under which the optical distance is measured does not differ by more than a tolerance value from the UWB-angle.

In some embodiments, the system comprises a further UWBST anchor-module being referenced to the coordinate system and having an anchor-identifier (anchor-ID), a further UWB-distance meter associated with the further UWBST anchor-module configured for measuring a UWB-distance between the further UWBST anchor-module and the UWBST tag-module and providing the measured UWB-distance with the assigned tag- and anchor-IDs to the machine control unit, wherein the machine control unit is further configured for determining a rough location (UWB-location) of the cooperative target based on the measured UWB-distances, and providing control information related to the determined UWB-location of the cooperative target to the total station or theodolite in order to align the tracking field of view to the cooperative target in order to be trackable and measurable by the tracking unit.

In some embodiments, the UWB-location of the cooperative target is determined based on at least one of the techniques of multilateration, triangulation, and angle of arrival measurements.

In some embodiments, the invention further relates to a computer program product which comprises program-code stored on a tangible, non-transitory machine-readable medium, which when executed on a machine control unit (e.g., computer having a processor) according to the invention instructs the machine control unit to confirm a mobile cooperative target being tracked and measured by a total station or theodolite according to the invention, and/or determine a rough location of such a cooperative target and provide related control information to the total station or theodolite according to the invention, using a total station or theodolite having a UWBST anchor-module, a cooperative target associated with a UWBST tag-module and a UWB distance meter associated with the UWBST anchor-module.

In some embodiments, the invention relates to an upgrade-kit for upgrading to a system which is configured for confirming a mobile cooperative target being automatically tracked and measured in order to automatically control a machine operation of a construction site machine, and comprises at least one total station or theodolite having a tracking unit configured for tracking and continuously measuring a cooperative target within a tracking field of view, wherein measuring relates to the determination of a distance to the cooperative target and of a horizontal and vertical angle to the cooperative target within a coordinate system, an optical distance meter for measuring an optical distance to a cooperative target, an ultra-wide band signal transceiver (UWBST) anchor-module (being referenced to the coordinate system) and having an anchor-identifier (anchor-ID), and a cooperative target associated with a UWBST tag-module having a tag-identifier (tag-ID) and being used for automatically controlling a machine operation of the construction site machine, a machine control unit associated with the construction site machine configured for controlling machine operations based on tracking and continuously measuring cooperative targets wherein tracking and continuously measuring is carried out by the total station or theodolite, an ultra-wide band (UWB) distance meter associated with the UWBST anchor-module configured for measuring a distance (UWB-distance) between the UWBST anchor-module and the UWBST tag-module and providing the measured UWB-distance with the assigned tag- and anchor-IDs to the machine control unit, wherein the upgrade-kit comprises the UWBST tag-module, the UWBST anchor-module associated with the UWB distance meter, and a computer program according to the invention.

BRIEF DESCRIPTION OF THE DRAWINGS

The inventive system is described below in more detail purely by way of example with the aid of concrete exemplary embodiments illustrated schematically in the drawings, further advantages of the invention also being examined. In detail.

DETAILED DESCRIPTION

Figure 1:
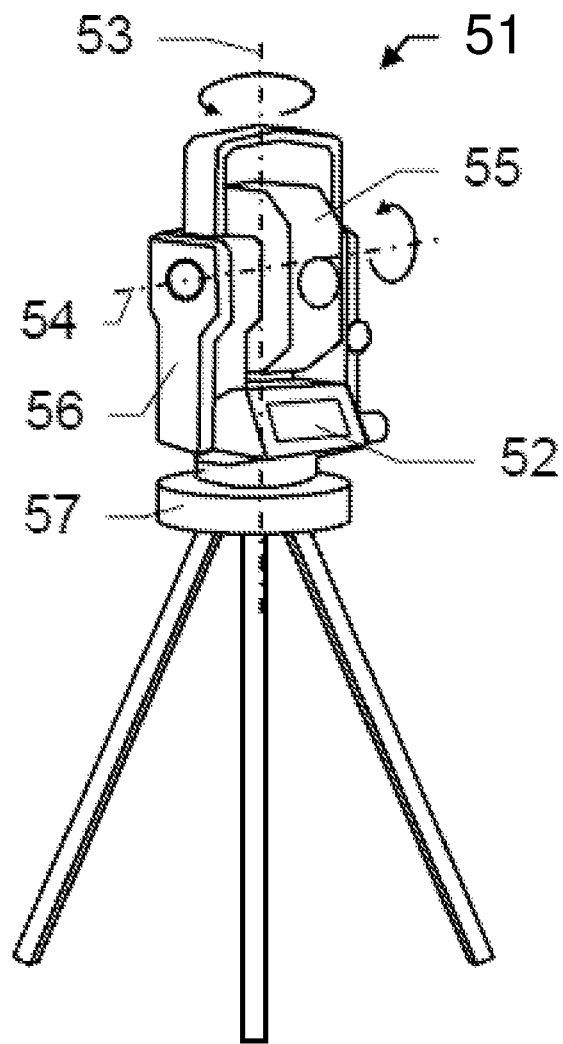
FIG. 1 shows a total station or theodolite according to the prior art.

FIG. 1 shows a total station or theodolite 51 according to the prior art, in this case the total station 51, comprises a tracking unit 55 which has an image acquisition unit, here exemplarily an overview camera, with an acquisition direction of the image acquisition unit being largely parallel to a measurement direction of a measuring apparatus likewise arranged in the total station or theodolite. An optical acquisition axis for the integrated image acquisition unit therefore extends at least in parallel, in particular coaxially, with the measurement axis defined by measurement radiation that can be emitted. A field of view of the image acquisition unit is defined by the optical unit installed in the tracking unit 55 and by the design of the tracking unit 55, with the measurement radiation likewise emerging through the optical unit and the direction thereof being defined thereby.

Moreover, the total station or theodolite 51 is provided with an output unit 52, in particular comprising a display, on which the images acquired by the overview camera can be depicted. Moreover, the device for aligning the measurement radiation or the acquisition direction with an object e.g. a cooperative target comprises two pivot axes 53, 54 (vertical axis 53 and tilt axis 54) perpendicular to one another. The total station or theodolite 3 or the measurement radiation that can be emitted can thereby be aligned with a point to be measured e.g. a cooperative target by rotating the tracking unit 55 about one or both axes 53, 54. In particular, this can be brought about in a motor-driven manner. To this end, the tracking unit 55 is mounted in a support 56 in a manner rotatable about the tilt axis 54 and thus the support 56 is arranged on a base 57 in a manner rotatable about the vertical axis 53.

Figure 2:
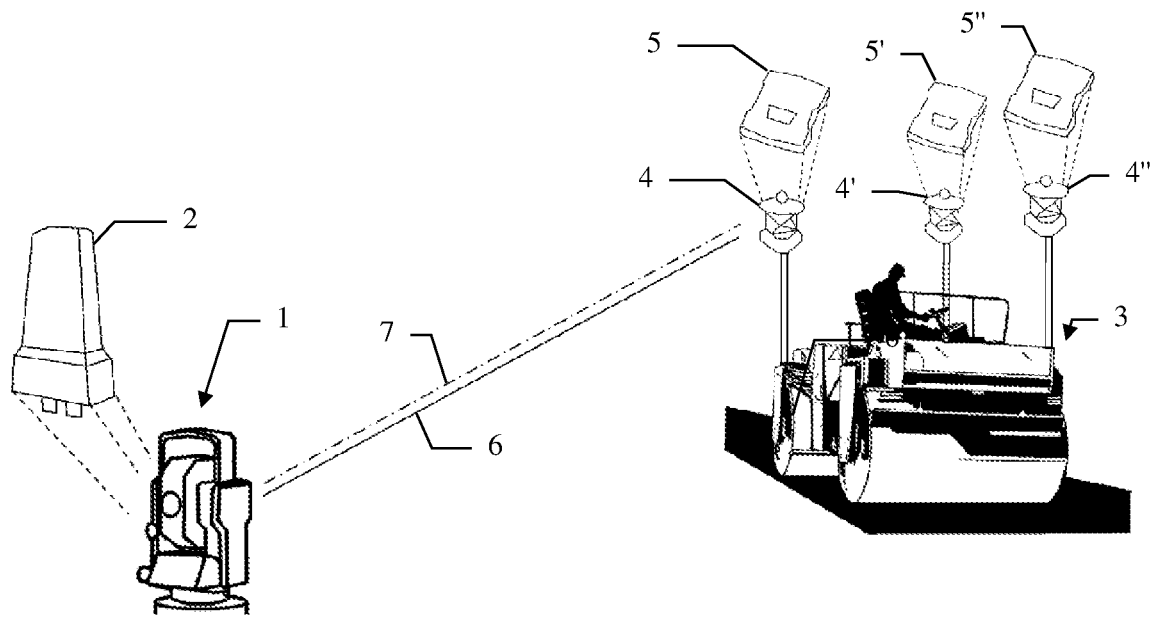
FIG. 2 shows an illustration of a system according to the invention comprising a total station having a UWBST anchor-module, and a construction site machine having cooperative targets each associated with a UWBST tag-module.

FIG. 2 illustrates a system according to the invention comprising a total station or theodolite 1 having a UWBST anchor-module 2, a construction site machine 3 and cooperative targets 4, 4', 4" each associated with a UWBST tag-module 5, 5', 5". The cooperative targets are installed on the construction site machine in relation to specific reference points of the machine. In the illustration and just as an example the specific reference points of the machine are three of the four outermost corner points of the machine. The cooperative targets are attached to one end of a stick or pole with known length, the other end of the stick or pole being fixed to one of the corner points of the machine. The total station is located at a safe distance from the operating machine in order to enable automatic tracking and continuous measuring of the cooperative targets without risking a collision. The machine control unit is not explicitly shown in the figure but is also comprised by the system. In a typical situation like the one schematically illustrated in FIG. 2 the total station is automatically tracking and continuously measuring the cooperative targets 4, 4', 4". By measuring a cooperative target its position within the coordinate system of the total station or theodolite is determined by determining a horizontal angle/azimuth angle, a vertical angle/elevation and a distance to the cooperative target. The distance to the cooperative target is measured by an optical distance meter as optical distance 6. Information related to the measured position is provided by the total station or theodolite to the machine control unit, wherein the machine control unit controls an according machine operation of the machine based on said information. According to construction specifications e.g. the measured cooperative target 4 and thereby its associated specific reference point of the machine needs to have a specific position in relation to the other cooperative targets 4', 4" and their associated reference points of the machine. In order to monitor and control these position relations between the cooperative targets the machine control unit needs to assign the according position information to the according cooperative target. In order to assign the position information to the "correct" cooperative target the machine control unit performs a matching of the optical distance 6 with the measured UWB-distance 7 in order to confirm that the "correct" cooperative target is measured. The UWB-distance is measured between the UWBST anchor-module 2 of the total station or theodolite and the UWBST tag-module 5 associated with the cooperative target. If the measured optical distance 6 matches the measured UWB-distance 7 the cooperative target is confirmed and the tag-ID of the according UWBST tag-module is assigned to the cooperative target. According to a specific embodiment matching can relate to checking if the measured optical distance 6 to the cooperative target does not differ by more than a tolerance value from the measured UWB-distance 7.

Figure 3:
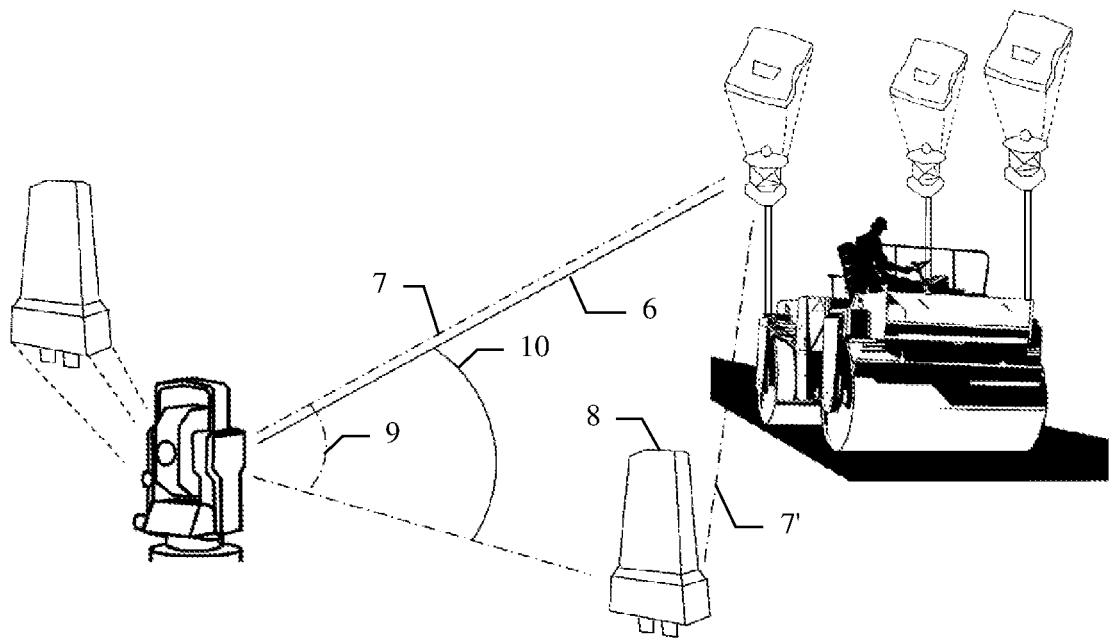
FIG. 3 shows an illustration of a system according to the invention comprising a total station having a UWBST anchor-module, a construction site machine having cooperative targets each associated with a UWBST tag-module and a further UWBST anchor-module.

FIG. 3 illustrates a system according to a specific embodiment of the invention the system having a further UWBST anchor-module 8 being referenced to the coordinate system. According to this specific embodiment the machine control unit additionally determines based on the measured UWB-distances 7, 7' and the referenced position of the further UWBST anchor module 8 the UWB-angle 9 under which the UWBST tag-module associated with the cooperative target is located in view of the total station or theodolite and in relation to the further UWBST anchor-module 8. The machine control unit further assigns the as determined UWB-angle 9 to the measured UWB-distance 7. According to this embodiment the machine control unit matches the UWB-distance 7 to the optical distance 6 and also the UWB-angle 9 to the horizontal angle/azimuth angle 10 under which the optical distance is measured and which is determined by the tracking unit of the total station or theodolite. Then the tag-ID of the UWBST tag-module associated to the cooperative target is assigned to the cooperative target if the measured optical distance 6 matches to the measured UWB-distance 7 and the UWB-angle 9 matches the horizontal angle/azimuth angle 10. According to a further specific embodiment matching in this case can relate to checking if the measured optical distance 6 to the cooperative target does not differ by more than a tolerance value from the UWB-distance 7, and if the horizontal angle/azimuth angle 10 under which the optical distance is measured does not differ by more than a tolerance value from the UWB-angle 9.

Figure 4:
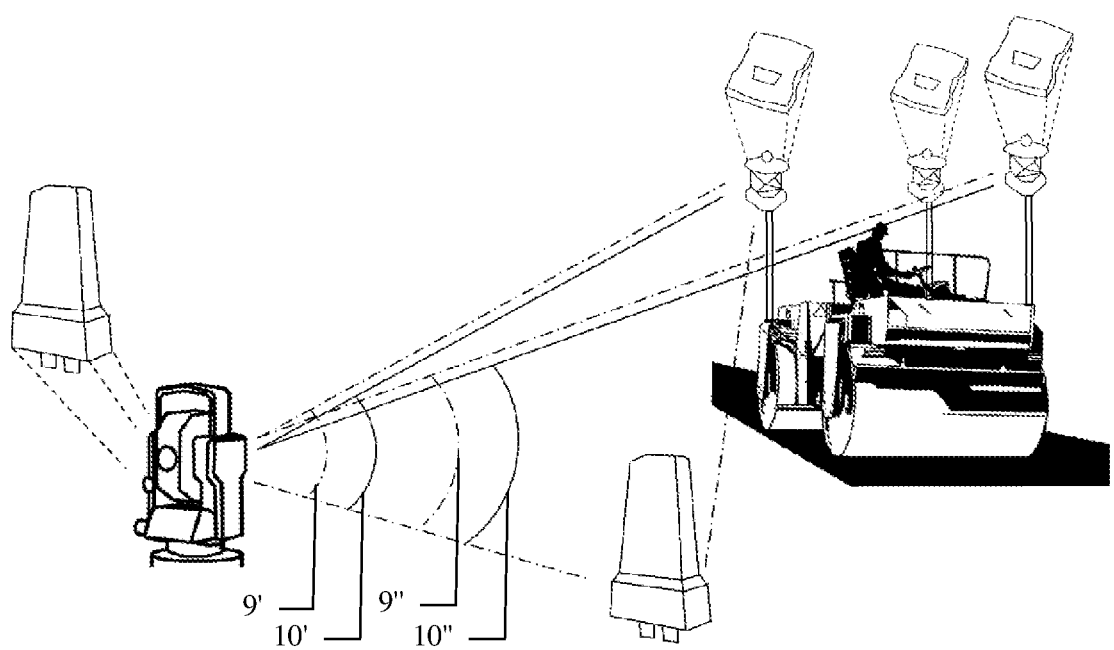
FIG. 4 illustrates a situation in which a system according to an embodiment to the invention is used for confirming a measured cooperative target.

FIG. 4 illustrates schematically a situation in which solely matching according measured optical distances to the UWB-distances can be ambiguous. In such a situation additionally matching according horizontal angles/azimuth angles 10', 10" to the UWB angles 9', 9" enables to unambiguously confirm the measured cooperative targets.

According to a further advantageous embodiment of the invention the system as e.g. schematically illustrated in FIG. 3 can be used to determine a rough location of the UWBST tag-module and the associated cooperative target using the measured UWB-distances 7, 7'. Therefore at least two UWB anchor-modules are needed. The machine control unit may then provide control information related to the as-determined rough location to the total station or theodolite in order to align the field of view of the tracking unit to the cooperative target in order to be trackable and measurable by the tracking unit. Thereby the rough location of the UWBST tag-module and the associated cooperative target can be determined using one of the following techniques: multilateration, triangulation (if enough UWBST anchor-modules are available) or angle of arrival measurements.

The invention further relates to an upgrade-kit which can be installed on prior art measuring equipment, the prior art measuring equipment comprising at least a total station or theodolite, a machine control unit, cooperative targets and a construction site machine. The upgrade-kit then comprises at least one UWBST anchor-module and UWBST tag-module and a computer program product which comprises software which can be installed on the prior art machine control unit in order to provide the functionalities according to any embodiment of the invention to the control unit. Thereby the prior art measuring equipment or system can be retrofitted with the upgrade-kit in order to be upgraded to the system according to the invention being used to confirm measured cooperative targets during the automatic control of machine operations of construction site machines.

It goes without saying that these figures illustrated are merely schematics of possible exemplary embodiments.

What is claimed is:

1. A system configured for confirming a cooperative target being automatically tracked and measured in order to automatically control a machine operation of a construction site machine, comprising:
   at least one total station or theodolite having:
      a tracking unit configured for tracking and continuously measuring the cooperative target within a tracking field of view, wherein measuring relates to the determination of a distance to the cooperative target and of a horizontal and vertical angles to the cooperative target within a coordinate system, an optical distance meter for measuring an optical distance to the cooperative target, wherein the cooperative target is mobile, and
      an ultra-wide band signal transceiver (UWBST) anchor-module, being referenced to the coordinate system, and having an anchor-identifier (anchor-ID),
   the cooperative target being associated with a UWBST tag-module having a tag-identifier (tag-ID) and being used for automatically controlling the machine operation of the construction site machine,
   a machine control unit associated with the construction site machine configured for controlling a plurality of machine operations based on tracking and continuously measuring a plurality of cooperative targets wherein tracking and continuously measuring is carried out by the total station or theodolite, and
   an ultra-wide band (UWB) distance meter associated with the UWBST anchor-module configured for measuring a distance (UWB-distance) between the UWBST anchor-module and the UWBST tag-module and providing the measured UWB-distance with the assigned tag- and anchor-IDs to the machine control unit,
   wherein the machine control unit is configured for matching measured optical distances to measured UWB-distances and using the matching as confirmation that the cooperative target being tracked and continuously measured by the total station or theodolite is the cooperative target being used for automatically controlling the machine operation,
   the system further comprising:
   a further UWBST anchor-module being referenced to the coordinate system and having a further anchor-identifier (anchor-ID), and
   a further UWB-distance meter associated with the further UWBST anchor-module configured for measuring a further UWB-distance between the further UWBST anchor-module and the UWBST tag-module and providing the measured further UWB-distance with the assigned tag- and anchor-IDs to the machine control unit,
   wherein the machine control unit is further configured for:
   determining and assigning a horizontal angle (UWB-angle) to the measured further UWB-distance, under which UWB-angle the UWBST tag-module is located in view of the total station or theodolite and in relation to the further UWBST anchor-module, and
   matching the horizontal angle under which the optical distance is measured and which is determined by the tracking unit to the UWB-angle.

2. The system according to claim 1, wherein the UWB-distance is measured based on a time of flight measurement of UWB signals being transmitted between the UWBST anchor- and tag-modules.

3. The system according to claim 1, wherein matching measured optical distances to measured UWB-distances comprises assigning the tag-ID assigned to the measured UWB-distance to the cooperative target if the measured optical distance to the cooperative target does not differ by more than a tolerance value from the measured UWB-distance.

4. The system according to claim 1, wherein matching measured optical distances to measured UWB-distances comprises assigning the tag-ID assigned to the measured UWB-distance to the cooperative target if the measured optical distance to the cooperative target does not differ by more than a tolerance value from the UWB-distance, and if the horizontal angle under which the optical distance is measured does not differ by more than a tolerance value from the UWB-angle.

5. The system according to claim 1, the system comprising:
   a further UWBST anchor-module being referenced to the coordinate system and having an anchor-identifier (anchor-ID),
   a further UWB-distance meter associated with the further UWBST anchor-module configured for measuring a UWB-distance between the further UWBST anchor-module and the UWBST tag-module and providing the measured UWB-distance with the assigned tag- and anchor-IDs to the machine control unit,
   wherein the machine control unit is further configured for:
   determining a rough location (UWB-location) of the cooperative target based on the measured UWB-distances, and
   providing control information related to the determined UWB-location of the cooperative target to the total station or theodolite in order to align the tracking field of view to the cooperative target in order to be trackable and measurable by the tracking unit.

6. The system according to claim 5, wherein the UWB-location of the cooperative target is determined based on at least one of the techniques of multilateration, triangulation, and angle of arrival measurements.

7. A computer program product comprising a non-transitory machine-readable medium having program-code stored on the machine-readable medium, which when executed on the machine control unit according to claim 1, instructs the machine control unit to:
   confirm the cooperative target being tracked and measured by the total station or theodolite, and/or determine a rough location of the cooperative target and provide related control information to the total station or theodolite,
   by the total station or theodolite having the UWBST anchor-module, the cooperative target being associated with the UWBST tag-module and the UWB distance meter associated with the UWBST anchor-module.

8. An upgrade-kit for upgrading to system for confirming the cooperative target being automatically tracked and measured in order to automatically control the machine operation of the construction site machine, comprising the at least one total station or theodolite having:
the tracking unit configured for tracking and continuously measuring the cooperative target within tracking field of view, wherein measuring relates to the determination of the distance to the cooperative target and of the horizontal and vertical angles to the cooperative target within the coordinate system,
the optical distance meter for measuring the optical distance to the cooperative target, and
the ultra-wide band signal transceiver (UWBST) anchor-module, being referenced to the coordinate system, and having the anchor-identifier (anchor-ID),
the cooperative target being associated with a UWBST tag-module having a tag-identifier (tag-ID) and being used for automatically controlling the machine operation of the construction site machine,
the machine control unit associated with the construction site machine configured for controlling a plurality of machine operations based on tracking and continuously measuring the plurality of cooperative targets wherein tracking and continuously measuring is carried out by the total station or theodolite,
the ultra-wide band (UWB) distance meter associated with the UWBST anchor-module configured for measuring the distance (UWB-distance) between the UWBST anchor-module and the UWBST tag-module and providing the measured UWB-distance with the assigned tag- and anchor-IDs to the machine control unit, wherein the upgrade-kit comprises:

the UWBST tag-module, the UWBST anchor-module associated with the UWB distance meter, and the computer program product according to claim 7.

* * * * *